Aug. 22, 1939.   E. J. WIENKE   2,170,466
PROJECTOR STAND
Filed Oct. 2, 1936   4 Sheets-Sheet 2
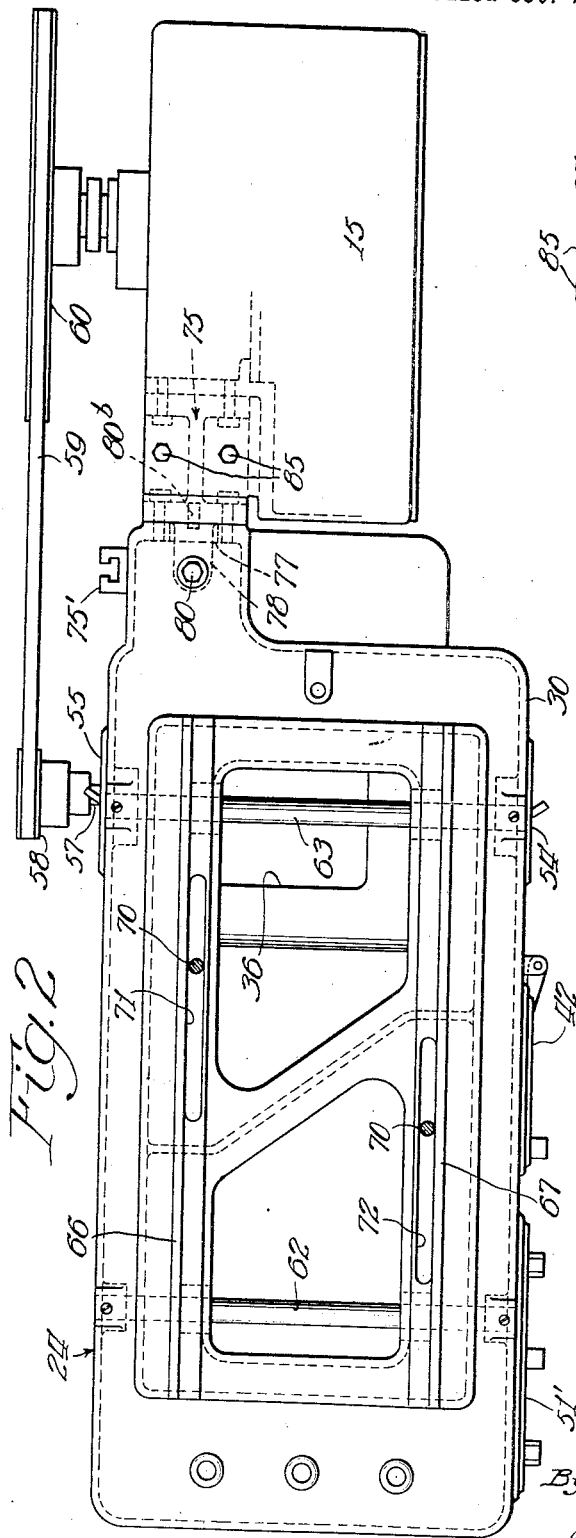
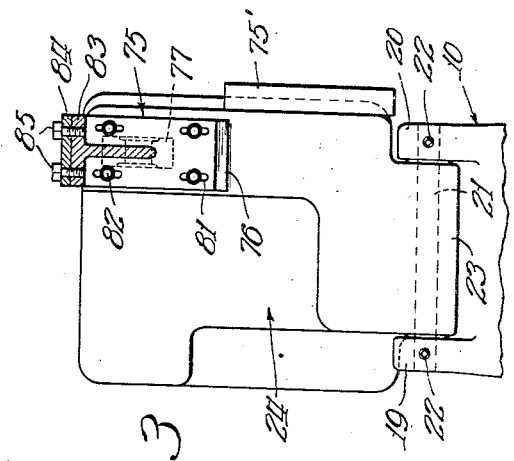
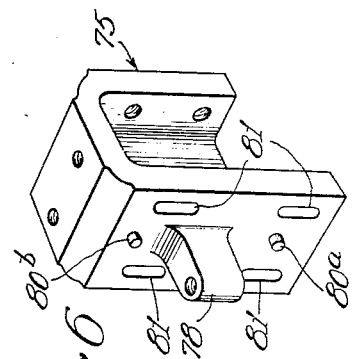
Inventor:
Emil J. Wienke
By Zabel Carlson & Wells
Attys.

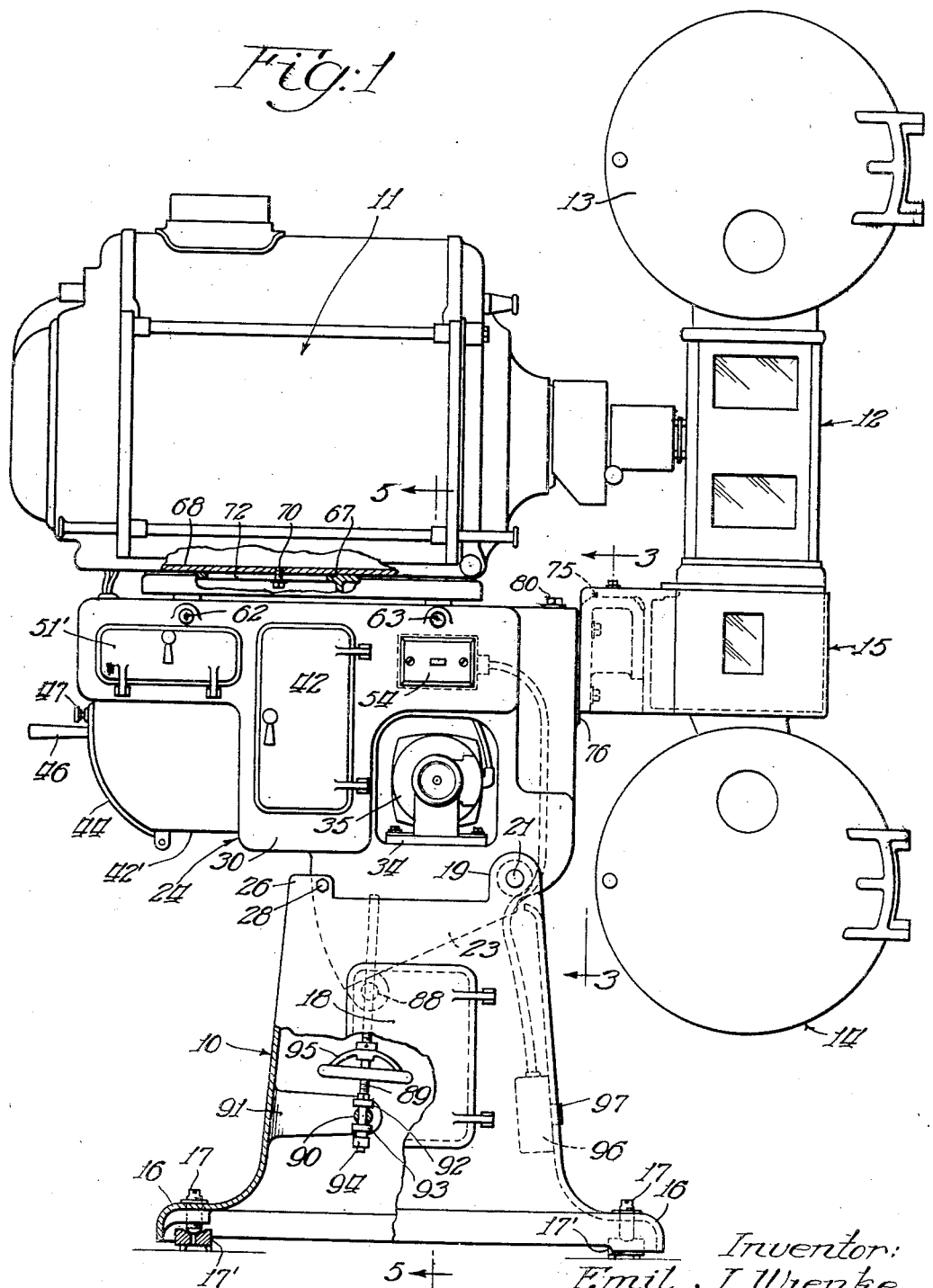

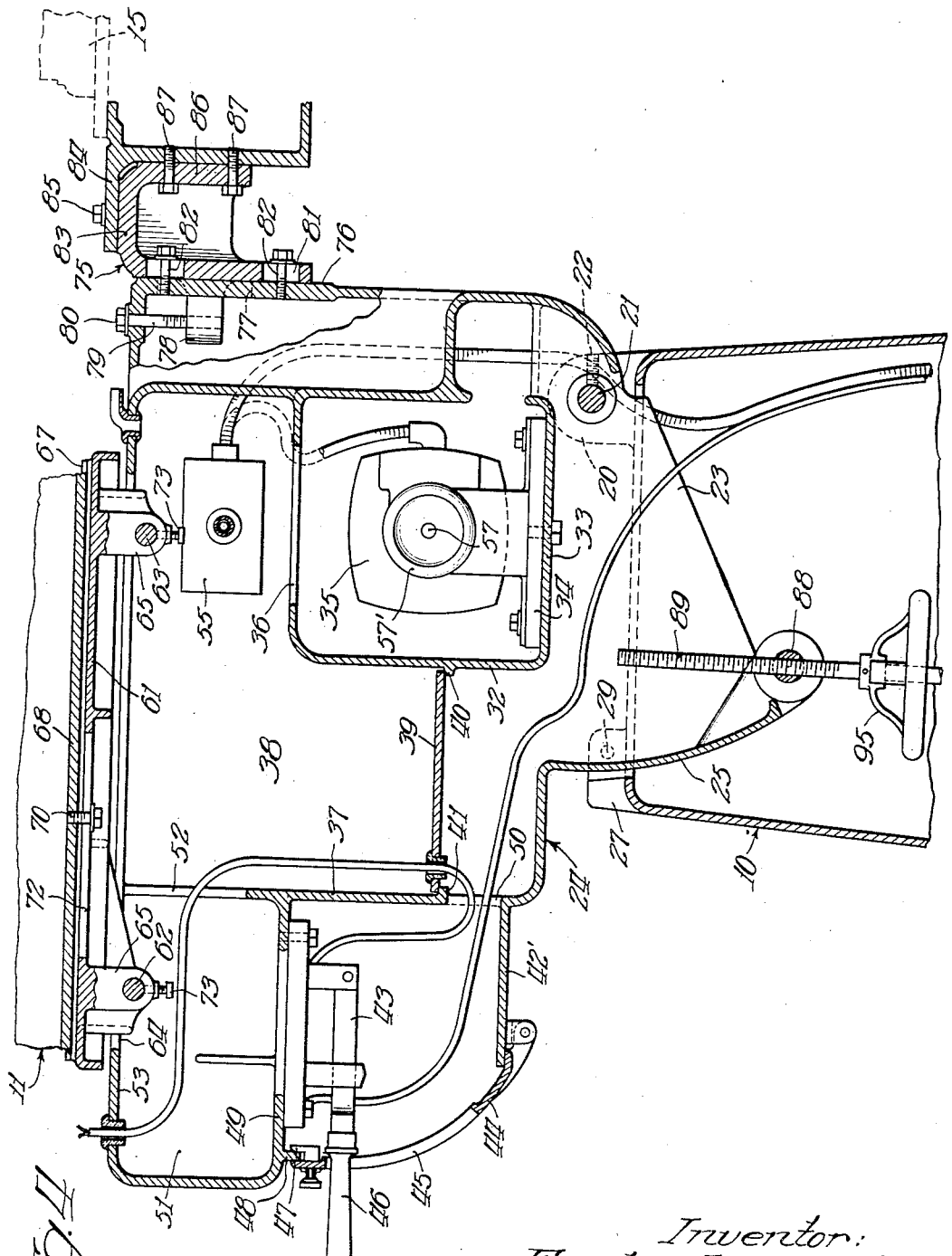

Aug. 22, 1939.　　　E. J. WIENKE　　　2,170,466
PROJECTOR STAND
Filed Oct. 2, 1936　　　4 Sheets-Sheet 4

Inventor:
Emil J. Wienke
By Zabel Carlson & Wells
Attys.

Patented Aug. 22, 1939

2,170,466

UNITED STATES PATENT OFFICE 2,170,466

PROJECTOR STAND

Emil J. Wienke, Chicago, Ill., assignor to Motiograph, Inc., Chicago, Ill., a corporation of Illinois Application October 2, 1936, Serial No. 103,649

3 Claims. (Cl. 248—11)

This invention relates to motion picture projectors and more particularly to improvements in the mounting for the projector lamp and the projector mechanism.

It is the principal purpose of this invention to provide in a device of this kind a supporting structure for the lamp and projector mechanism comprising a casing which may be desirably cast as a unit, a base upon which the casing is pivoted, an adjustable lamp housing mounting on the casing, and an adjustable projector mounting on the casing.

Features and advantages of the invention will appear more readily from the following description, reference being had to the accompanying drawings wherein a preferred form of the invention is shown. It is to be understood, however, that the drawings and description are illustrative only and are not to be taken as limiting the invention except insofar as it is limited by the claims.

In the drawings—

Fig. 1 is a view in side elevation of a projector embodying the invention;

Fig. 2 is a plan view of the projector with certain parts left off for the sake of clearness.

Fig. 3 is a sectional view on the line 3—3 of Fig. 1;

Fig. 4 is a longitudinal sectional view taken substantially on the line 4—4 of Fig. 2;

Fig. 6 is a perspective view of the projector mounting bracket.

Figure 5:
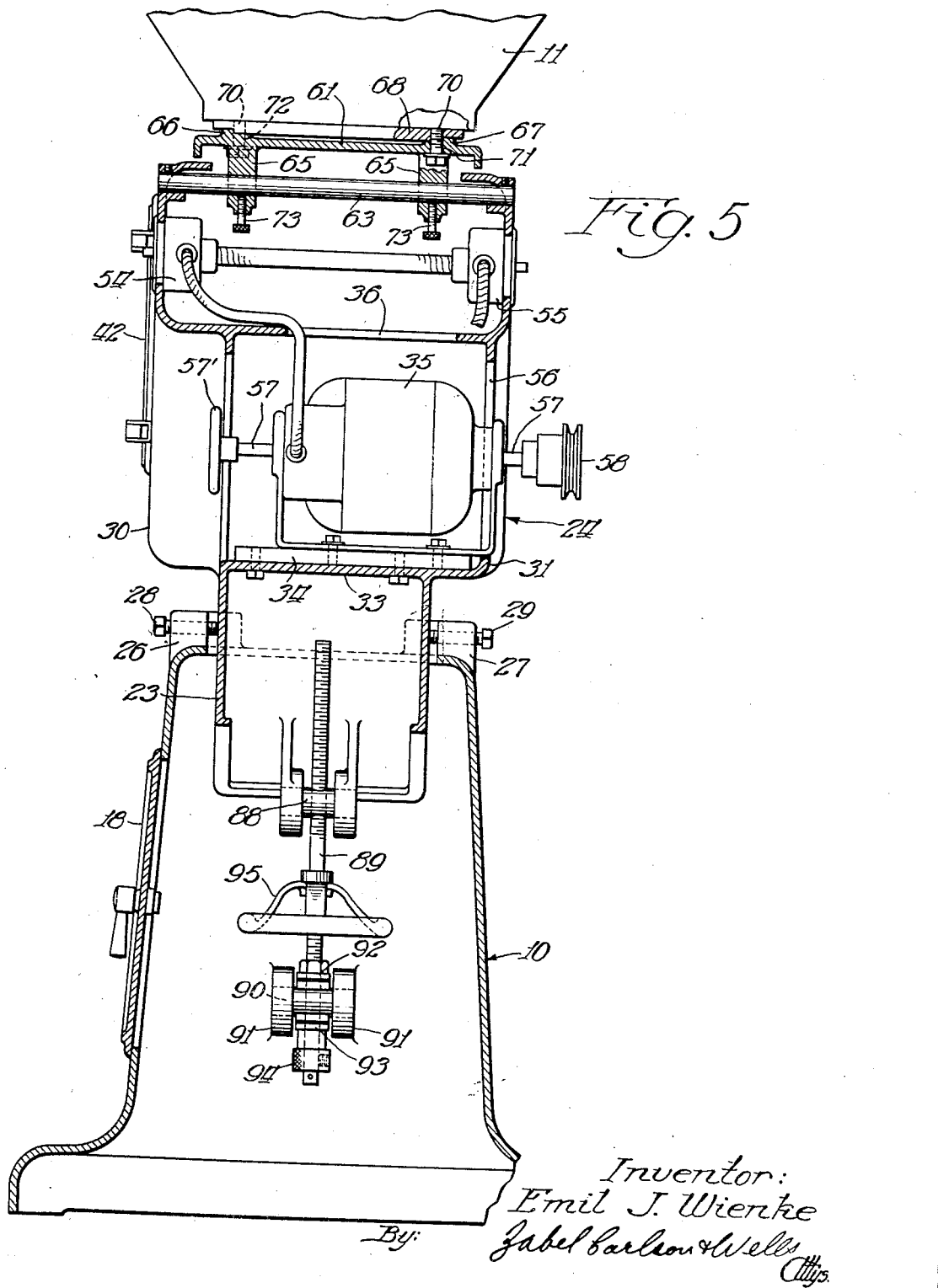
Fig. 5 is a sectional view on the line 5—5 of Fig. 1.

Referring now in detail to the drawings, the invention is shown as applied to a projector having a base 10, a lamp housing 11, a projector mechanism 12 carrying suitable film magazines 13 and 14, and a sound reproducing mechanism 15.

Steadiness of projection and accuracy of adjustment of the projector and the projector lamp makes it necessary to provide a rigid foundation or base upon which the projector and projector lamp may be mounted. The base 10 preferably consists of a hollow casting which is flared outwardly as indicated at 16 to provide ample floor contact and proper balance for the projector. The base carries four screw-threaded leveling plugs 17 resting upon suitable leveling sockets 17' by means of which proper contact with the floor can be established. As shown, the sockets 17' are hollowed out at the top to receive the plugs 17. The hollow interior of the base is made accessible by means of a door 18 in the side thereof.

At the top of the base at one end thereof, upwardly projecting lugs 19 and 20 provide a mounting for a shaft 21 which is locked in place by means of set screws 22 (see Figs. 3 and 4).

The shaft 21 has pivoted thereon a depending portion 23 of a lamp and projector supporting casing 24. The casing 24 is cast as a single body to provide a housing for the projector motor and the necessary switching equipment and to provide a mounting for the lamp housing 11 and the picture and sound projecting mechanism 12 and 14.

The depending portion 23 is hollow and extends downwardly toward the rear of the base, terminating in a curved rear wall 25. The upper end of the base 10 is open to receive the depending part 23 of the casting 24. At the rear end of the base 10 are lugs 26 and 27. These lugs, as shown best in Fig. 5, are provided with locking bolts 28 and 29 by means of which the casting 24 can be locked in position. Above the portion 23, the casting walls are expanded outwardly as indicated at 30 and 31.

A partition wall 32 has a floor section 33 upon which a base plate 34 of a projector motor 35 is bolted. This partition wall is provided with an opening 36 at the top. The partition wall 32 and a second partition wall 37 spaced rearwardly of the partition wall 32 provide a compartment 38 in the casting which compartment may be used for the storage of the necessary implements used around the projector. A shelf 39 is provided in this compartment, this shelf being supported upon projections 40 and 41 on the partition walls 32 and 37, respectively. A door 42 provides access to the compartment 38.

To the rear of the partition wall 37, the casting 24 has a small switch housing formed by the rearwardly projecting ledge 42' and the side walls of the casting. A control switch 43 is mounted in this compartment, and the compartment is closed by a hinged door 44. The door 44 is slotted as indicated at 45 for the passage of an operating handle 46 of the switch 43. A latch 47 is carried by the door 44 and is adapted to engage against a depending rib 48 to hold the door 44 in closed position. The switch compartment housing the switch 43 is partly closed at the top by a horizontally running partition wall 49. This partition wall 49 and the base of the switch 43, which is attached to the wall 49, together entirely close the top of the housing for switch 43. The lower portion of the wall 37 has an opening 50 for wiring to the switch 43. A compartment 51 above the partition wall 49 opens into the compartment 38 through an opening provided at 52 so that the wiring for the projector lamp may be brought from the terminals of the switch 43 through the shelf 39 into the compartment 38 and thence up through the opening 52 into the compartment 51 and through the top wall 53 of the compartment 51 to the lamp housing 11. The compartment 51 is provided with a door 51' at one side. This compartment may be used to store short and long carbons for the projection lamp.

Above the opening 36 in the top of the motor compartment, a pair of motor control switches 54 and 55 are mounted, each switch having a handle exposed on the exterior of the casting so that the motor may be operated from either side of the projector. The casting 24 has an opening at 56 through which the drive shaft 57 of the motor 35 projects, this drive shaft being provided with a drive pulley 58 adapted to be connected by a belt 59 to a pulley 60 that operates the film moving mechanism of the projector. The drive shaft 57 has a hand wheel 57' thereon. The hand wheel 57' is used as a convenient means of turning the pulley 58 to adjust the film by hand.

The lamp housing 11 is supported for adjustment on the casting 24 by means of a cast platform 61, which is carried on two rods 62 and 63 that are mounted in the top of the casting 24 and spaced slightly below an opening 64 in the top of the casting 24. The platform 61 has four depending lugs 65 through which the rods 62 and 63 extend. The platform 61 is provided with guide rails 66 and 67 adapted to receive a bottom plate 68 of the lamp housing 11. This plate 68 is thickened between the guide rails 66 and 67 so as to prevent lateral shifting of the lamp housing with respect to the platform 61. The lamp housing, however, is adjustable longitudinally on the platform by sliding it along the guide rails 66 and 67, and it may be locked in place by means of bolts 70 which ride in the guide slots 71 and 72 located just inside the rails 66 and 67 in the platform 61. The depending lugs 65 are slidable longitudinally on the rods 62 and 63, and may be locked in position thereon by set screws 73. It is understood, of course, that a set screw is provided for each one of the lugs 65.

Thus it is possible to shift the housing 11 transversely of the casting 24 by adjusting the platform 61 so as to properly align the housing with the projector mechanism. The housing can be moved forward and backward on the guide rails 66 and 67 to set the lamp at the proper distance from the projector mechanism 12 after which it is locked in place by bolts 70.

For relative vertical adjustment between the projector mechanism and the lamp housing, a bracket 75 is adjustably mounted on the front end of the casting 24 in the following manner: The front end face of the casting 24 is thickened at 76 and is milled off smooth so that the bracket 75 can be fitted smoothly against it. The casting is provided with an opening 77 running vertically therein through which a lug 78 on the bracket 75 extends. A bolt 79 is screw threaded into the lug 78 and has its head 80 resting on the top of the casting 24 so that, by turning this bolt, the bracket 75 can be adjustable up and down. Guide pins 80a and 80b are provided on the face of the bracket 75 and ride in a groove (not shown) that is milled in the casting 24.

The bracket 75 is provided with elongated slots 81, of which there are four, and securing studs 82 pass through these slots and are threaded into the thickened portion 76 of the casting 24. The bracket 75 has a flat top portion 83 adapted to mount a ledge 84 on the sound housing of the projector mechanism. Suitable screw bolts 85 are used for attaching the ledge 84 to the bracket 75. The sound housing 15 is further secured to a flange 86 of the bracket 75 by screw bolts 87. For other sound unit attachment, a bracket 75' (see Fig. 2) may be fastened on the side of the casting 24. This bracket has a T slot therein for removably mounting such attachments.

It is believed to be evident from the above description, that the bracket 75 and the sound reproducing and projecting mechanism carried thereby may be adjusted vertically with respect to the casting 24 and set in place by tightening the screw bolts 82.

For angular adjustment of the entire projector mechanism with respect to the base 10, the depending portion 23 of the casting 24 carries a transversely extending shaft 88 at the lower end of the curved rear wall 25, and this shaft which can turn in the depending portion 23 has an adjusting screw 89 screw threaded therein. This adjusting screw is mounted on a shaft 90 that is carried by lugs 91 cast on the interior of the base 10. The shaft 90 is free to turn, but the adjusting screw 89 is fixed to the shaft 90 so that it cannot move endwise with respect to the shaft. Suitable ball bearings such as 92 and 93 and a nut 94 are utilized to rotatably support the adjusting screw 89 on the shaft 90. A hand wheel 95 is mounted on the adjusting screw 89 and is accessible through the door 18 as will be readily understood. When the projector mechanism has been set to the proper angle with respect to the base 10, it is then locked in position by tightening the set screws 28 and 29 against the sides of the depending portion 23.

The casting 24 and the base 10 are so arranged that all wiring is concealed. A junction box 96 is mounted inside the base 10 and is provided with a convenience receptacle 97. Ordinary B-X cable can be used to connect switches 54 and 55 in the circuit of motor 35 and to connect this circuit to the junction box 96. Leads to the switch 43 and the lamp housing are also taken from the junction box.

From the above description, it is believed that the construction and advantages of this device will be readily apparent to those skilled in this art.

Having thus described one specific form of my invention, what I claim as new and desire to secure by Letters Patent is:

1. In a projector supporting stand of the character described, a base, a hollow casting pivoted to said base, said casting having a platform on the top thereof provided with means to support a lamp housing thereon, said casting having a projector supporting bracket secured to one end thereof and adjustable vertically with respect thereto.

2. In a projector stand, a hollow cast base, a hollow lamp housing and projector supporting casting pivoted on said base having a portion depending into said base, said last named casting having a lamp housing platform movably mounted thereon, and a projector mounting bracket vertically adjustable thereon.

3. In a projector supporting stand of the character described, a base, a hollow casting pivoted to said base, said casting having a platform on the top thereof provided with means to support a lamp housing thereon, said casting having a projector supporting bracket secured to one end thereof and adjustable vertically with respect thereto, said platform being horizontally movable on the casting.

EMIL J. WIENKE.